United States Patent [19]

Konig

[11] Patent Number: 5,242,331
[45] Date of Patent: Sep. 7, 1993

[54] V-BELT DRIVE WITH CLAMPING DEVICE

[75] Inventor: Heinz Konig, Harsewinkel, Fed. Rep. of Germany

[73] Assignee: Claas oHG, Harsewinkel, Fed. Rep. of Germany

[21] Appl. No.: 882,156

[22] Filed: May 12, 1992

[51] Int. Cl.$^5$ ............................................. F16H 7/00
[52] U.S. Cl. ..................................... 474/101; 474/134
[58] Field of Search .................... 474/101, 109–111, 474/113, 117, 133–138

[56] References Cited

U.S. PATENT DOCUMENTS

| | | | |
|---|---|---|---|
| 258,242 | 5/1882 | Merritt | 474/134 |
| 2,791,910 | 5/1957 | Eckley | |
| 2,827,795 | 3/1958 | Hector | 474/134 X |
| 3,206,009 | 9/1965 | Wahl | |
| 3,391,807 | 7/1968 | Buschbom | 474/134 X |
| 4,147,070 | 4/1979 | McMillan | |

*Primary Examiner*—Thuy M. Bui
*Attorney, Agent, or Firm*—Browdy and Neimark

[57] ABSTRACT

The V-belt drive has a V-belt (R), revolving endlessly around a drive pulley (A) and at least one driven pulley (C) and a back chucking roller (D) is associated with the V-belt on the slack side (R1). The back chucking roller (D) is preceded in the belt travel direction (RL) by a profiled idler pulley (E), and both rollers (D, E) form a clamping unit (SE) that is subjected to clamping force action and acts near the driven pulley (C). In every position of the clamping unit (SE) the entry and exit point (G1 and G2, respectively) of the V-belt (R) at the profiled idler pulley (E) are located before, in the belt travel direction (RL), or at best coincide with the entry point (K1 and K2, respectively) of the back chucking roller (D).

4 Claims, 2 Drawing Sheets

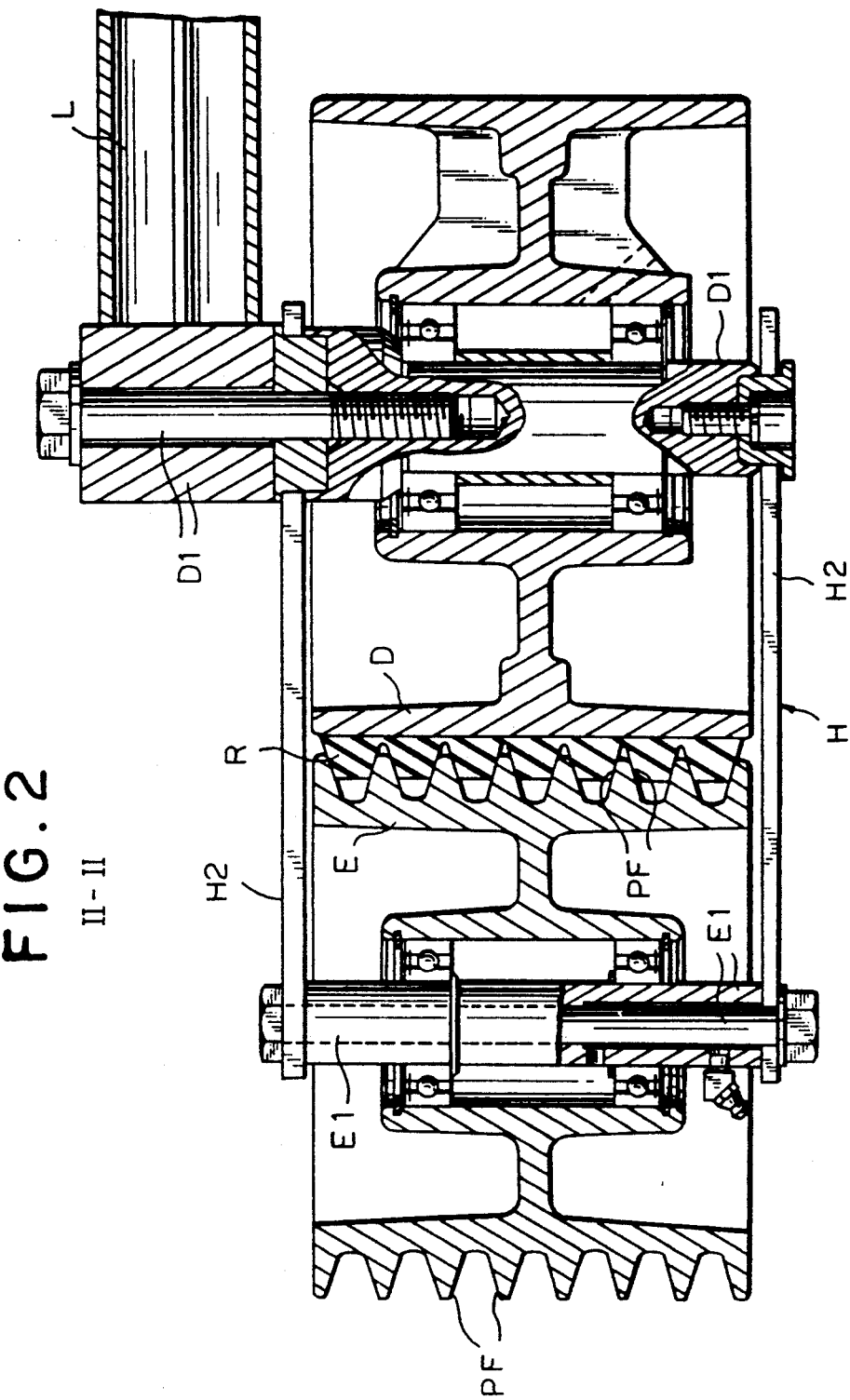

V-BELT DRIVE WITH CLAMPING DEVICE

BACKGROUND OF THE INVENTION

The invention relates to a V-belt drive having a V-belt, which travels endlessly around a drive pulley and at least one driven pulley and where a back chucking roller is associated with the slack side.

Internal or back chucking rollers are known for chucking and guiding V-belts. Internal chucking rollers are as a rule profiled. Rollers with and without flanged edges are known for back chucking rollers.

Internal or back rollers are used not only for clamping or chucking but also as deflection rollers.

For clamping belts, the roller selected is preferably attached to the loose on slack side of the belt.

To prevent lateral slip of the belt during its revolution when the center distances are relatively large ($A \geq 2 \times (D+d)$ of the driving and driven pulleys), the arrangement of the roller in the case of back chucking rollers must be as close as possible to the pulley with the outgoing side of the belt, in accordance with the recommendations of V-belt manufacturers (see the corporation brochure entitled "Optibelt", page 34, "Sonderantriebe Spann-/Führungsrollen" [Special Drive Systems, Clamping/Guide Rollers]).

With the preferential disposition of the back chucking roller on the slack side, the position of the chucking roller in the case of a two-pulley drive is then located on the slack side as close as possible to the drive pulley.

If this specification is not adhered to, then despite major expenditure for alignment, it often happens that the upper edge of the belt will continuously run up on or press against one of the flanged edges, or alternatingly-both, of the back chucking roller and thus cause premature wear, or even destruction of the belt by jumping off track.

SUMMARY OF THE INVENTION

It is the object of the invention to improve a belt drive of the type described at the outset above such that it is provided with an initial stress over the entire range of its service life, so that even long belt segments are protected from lateral slippage of the belt in the event that the drive and driven shafts twist relative to one another, without increased wear occurring.

According to the invention, this object is attained in that the back chucking roller is preceded in the belt travel direction by a profiled idler pulley, and both rollers form a clamping unit that is subject to the effect of clamping force and acts near the driven pulley.

It is especially advantageous if the point where the belt exits from the profiled idler pulley is located at such a distance before the belt entry point at the back chucking roller that a certain equalization of the belt position can occur.

Advantageously, the back chucking roller and the idler pulley are retained at a fixed distance from one another in a U-shaped retainer; the retainer is pivotable about the pivot point of the driven pulley by a connecting rod, so that the distance between the clamping unit and the driven pulley is defined.

The retainer at the back chucking roller and idler pulley is acted upon transversely to the longitudinal direction of the connecting rod with the compressor force of a hydraulic cylinder or compression spring cylinder. This cylinder is rigidly connected at one end to the retainer of the clamping unit and at the other is pivotably supported at a fixed point.

The idler pulley is profiled to complement the profiling of the belt, whether in the form of a single belt, a plurality of single belts, or a composite V-belt, in order to provide good lateral guidance of the belt along the profiled edged of the idler pulley.

Because of the combination of the back chucking roller and the profiled idler pulley to provide a clamping unit, this unit can be disposed in an arbitrary position, or in other words far away from the drive roller on the slack side of the belt.

This clamping unit serves on the one hand to clamp and guide V-belts and composite belts, and on the other it can also be used to deflect and guide such belts.

BRIEF DESCRIPTION OF THE DRAWINGS

An exemplary embodiment of the invention will now be described in further detail, referring to the drawings. Shown are:

FIG. 2, a section through the clamping unit taken along the line II—II of FIG. 1.

DETAILED DESCRIPTION OF THE PREFERRED EMBODIMENT OF THE INVENTION

Figure 1:
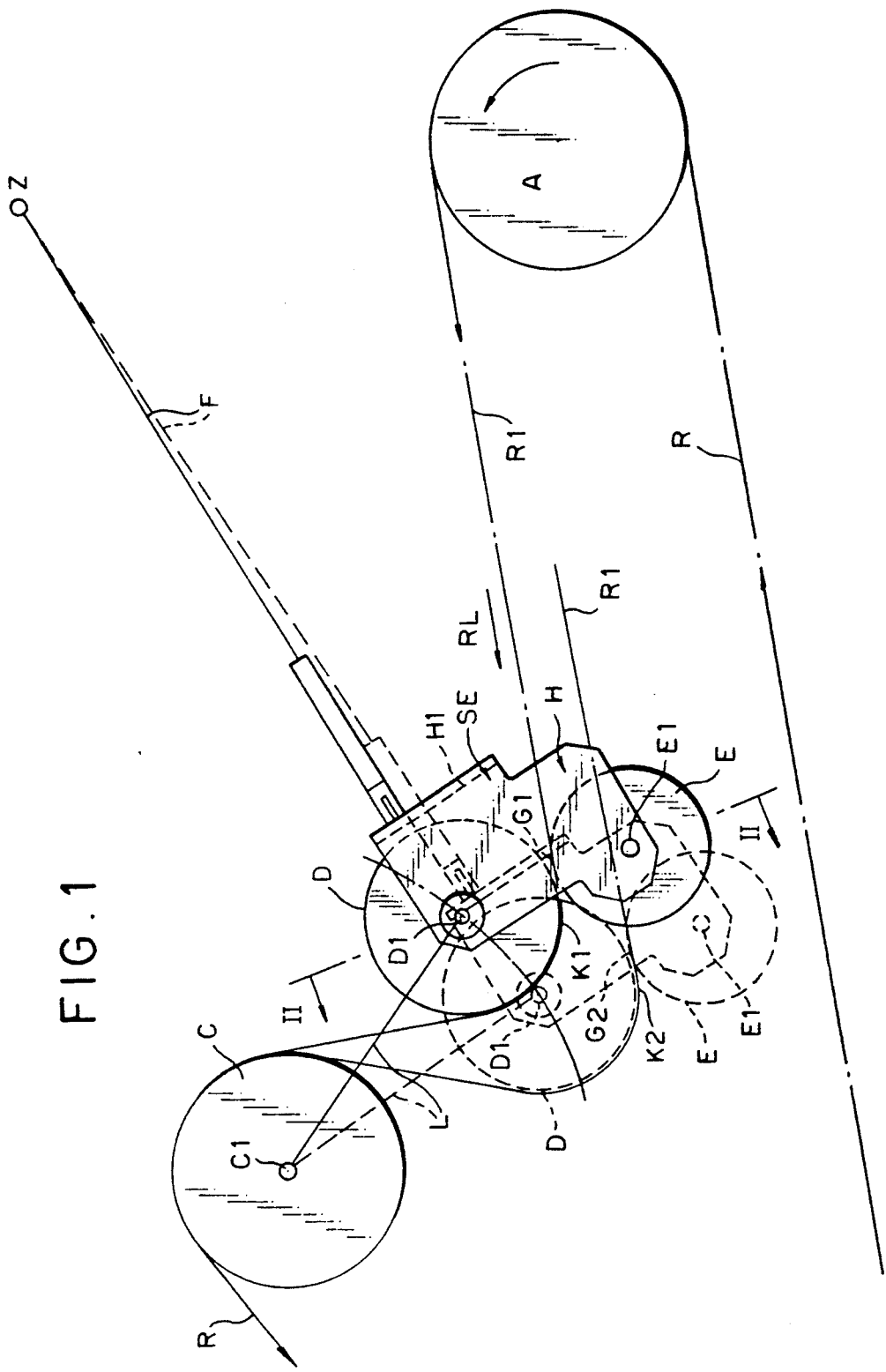
FIG. 1, a schematic side view of a V-belt drive with a clamping unit, associated with the slack side and formed by a back-chucking roller, a profiled idler pulley, a connecting rod and pressure cylinder, this unit being disposed near a driven pulley.

The V-belt drive has a V-belt (R), revolving endlessly about a drive pulley (A) and at least one driven pulley (C); a back chucking roller (D) is associated with it on the slack side (R1). The back chucking roller (D) is preceded in the belt travel direction (RL) by a profiled idler pulley (E), and the two rollers (D, E) form a clamping unit (SE) that is subject to the effect of a clamping force and acts near the driven pulley (C).

In every position of the clamping unit (SE), the points (G1 and G2) at which the V-belt (R)—specifically the slack side (R1)—enters and exits from the profiled idler pulley (E) are located in the belt travel direction (RL) before, or at best coincidentally with, the entry point (K1 or K2) of the back chucking roller (D).

The back chucking roller (D) and the profiled idler pulley (E) are supported rotatably in a retainer (H), at which a pressure fluid or compression spring cylinder (F) is rigidly joined to one long end, while by its other long end it is pivotably suspended from a fixed point (Z). A hydraulic or compressed air cylinder may be provided as the pressure fluid cylinder (F).

By means of a connecting arm (L) engaging it between the pivot shaft (C1) of the driven pulley (C) and the pivot shaft (D1) of the back chucking roller (D), the clamping unit (SE) is retained pivotably about the pivot shaft (C1) of the driven pulley (C) upon simultaneous longitudinal displacement of the hydraulic or compression spring cylinder (F).

In FIG. 1, one terminal position of the clamping position of the clamping unit (SE) is shown in solid lines and the other is shown in dashed lines; the inlet and outlet points (G1) and (K1) are applicable for one position (solid lines), while (G2) and (K2) are applicable for the other, adjusted-tension position (dashed lines).

E1 identifies the pivot shaft of the idler pulley (E).

As shown in FIGS. 1 and 2, the retainer (H) is made for instance by two bearing plates (H2) and a crossbar (H1) producing a retainer (H) with a U-shaped cross section. The shafts (E1, D1) of the two rollers (E, D) are retained between bearing plates (H2) while the compression spring or hydraulic cylinder (F) is firmly attached on a crossbar (H1), and accordingly moves along with the retainer (H) upon tension adjustment.

During the travel time of the belt (R), this belt lengthens within a readjustment range, so that the clamping unit (SE) shifts in a tension-adjusting manner. Since the disposition of the hydraulic or compression spring cylinder (F) is made at an angle, such as a right angle, obtuse angle, or the like, to the connecting rod (L), the distance between the exit point (G1, G2) of the idler pulley (E) and the entry point (K1, K2) of the back chucking roller (D) always remains approximately equal, so that this distance always assures an adequate compensation of the belt (R) without considerable shear forces being produced. The points (G1) and (K1) (G2 and K2) may also come to coincide, in the case of maximum tension adjustment.

The distance between the clamping unit (SE) and the drive pulley (A) is greater by a multiple than the distance between the clamping unit (SE) and the driven pulley (C).

If the pivot angle of the connecting rod (L) about the point (C1) is relatively large, the direction of the hydraulic or compression spring cylinder (F), including the clamping unit (SE), varies virtually not as all, as represented in FIG. 1 by solid and dashed lines.

The idler pulley (E) as a result is given the function of a guide roller, which delivers the belt (R) in an aligned manner to the back chucking roller (D).

The belt guidance of the V-belt (R) takes place at the profiled edges (PF) of the idler pulley (E)—see FIG. 2—and the belt tension is effected by the back chucking roller (D) of the clamping unit (SE).

Profiled single belts, a plurality of profiled single belts, or a composite belt may be used as the V-belt (R).

The possibility exists of also associating the clamping unit (SE) with the load side of the belt (R).

What is claimed is:

1. A V-belt drive having a V-belt revolving endlessly about a drive pulley and at least one driven pulley, the slack side of the V-belt being engaged to a back chucking roller, said V-belt drive comprising said bank chucking roller (D) preceded in said V-belt travel direction (RL) by a profiled idler pulley (E), said idler pulley having a plurality of ridges around a circumference thereof, said plurality of ridges engaging a plurality of corresponding longitudinal grooves on a side opposite said slack side of said V-belt, said back chucking roller (D) and said profiled idler pulley (E) forming a clamping unit (SE) that is subjected to clamping force action near said driven pulley (C), wherein in every position of said clamping unit (SE), an entry and exit point (G1, G2) of the V-belt (R) on said profiled idler pulley (E) is located before, in the belt travel direction (RL), or at most coincides, with an entry point (K1, K2) of said back chucking roller (D), wherein said back chucking roller (D) and said profiled idler pulley (E) are supported rotatably in a retainer (H), on which a pressure fluid or compression spring cylinder (F) is rigidly secured at a first end and is suspended pivotably from a fixed point (Z) by a second end.

2. The V-belt drive of one of claim 1, wherein said clamping unit (SE) is pivotably retained and rotated about a pivot shaft (C1) of said driven pulley (C) by means of a connecting rod (L) engaging said clamping unit (SE) between said pivot shaft (C1), and a pivot shaft (D1) of said back chucking roller (D), upon simultaneous longitudinal displacement of said hydraulic or compression spring cylinder (F).

3. The V-belt drive of one of claim 2, wherein said V-belt is guided by profiled edges (PF) of said idler pulley (E), and said V-belt tension is effected by said back chucking roller (D) of said clamping unit (SE).

4. The V-belt drive of one of claim 3, wherein said V-belt (B) is embodied by a profiled single belt, a plurality of profiled single belts, or a composite belt.

* * * * *